(12) United States Patent
Zhang et al.

(10) Patent No.: US 10,563,572 B2
(45) Date of Patent: *Feb. 18, 2020

(54) CHARGING DEVICE FOR AN INTERNAL COMBUSTION ENGINE AND OPERATING METHOD FOR THE CHARGING DEVICE

(71) Applicant: CPT Group GmbH, Hannover (DE)

(72) Inventors: Hong Zhang, Tegernheim (DE); Werner Bender, Worms (DE)

(73) Assignee: Vitesco Technologies GmbH, Hannover (DE)

( * ) Notice: Subject to any disclaimer, the term of this patent is extended or adjusted under 35 U.S.C. 154(b) by 122 days.

This patent is subject to a terminal disclaimer.

(21) Appl. No.: 15/468,633

(22) Filed: Mar. 24, 2017

(65) Prior Publication Data
US 2017/0198631 A1 Jul. 13, 2017

Related U.S. Application Data

(63) Continuation of application No. PCT/EP2015/069602, filed on Aug. 27, 2015.

(30) Foreign Application Priority Data

Oct. 15, 2014 (DE) .................. 10 2014 220 931

(51) Int. Cl.
*F02B 37/00* (2006.01)
*F02B 37/10* (2006.01)
(Continued)

(52) U.S. Cl.
CPC ............ *F02B 37/005* (2013.01); *F02B 37/10* (2013.01); *F02B 39/10* (2013.01); *H02K 7/1823* (2013.01);
(Continued)

(58) Field of Classification Search
CPC .... F02B 37/001; F02B 37/004; F02B 37/005; F02B 37/013; F02B 37/10; F02B 39/10; H02K 7/1823
See application file for complete search history.

(56) References Cited

U.S. PATENT DOCUMENTS 4,282,713 A 8/1981 Antoku et al.
5,168,706 A 12/1992 Kawamura
(Continued)

FOREIGN PATENT DOCUMENTS

DE 2823067 A1 12/1978
DE 19712850 A1 10/1998
(Continued)

OTHER PUBLICATIONS

International Search Report and Written Opinion dated Dec. 17, 2015 from counterpart International Patent Application No. PCT/EP2015/069602.
(Continued)

*Primary Examiner* — Ngoc T Nguyen

(57) ABSTRACT

A charging device for an internal combustion engine, having an exhaust turbocharger and a recuperation-charger having a compressor-turbine and an electromechanical motor-generator coupled thereto. The high-pressure side of the compressor-turbine is connectable, by a valve arrangement, to the outside air supply line before the exhaust turbocharger on one side and on the other side, to the charge air supply line after the exhaust turbocharger. Outside air can be suctioned or charge air blasted via the low-pressure side of the compressor-turbine. The recuperation-charger is switched, by the valve arrangement and the motor-generator, between a standard mode, an amplifier mode and a recuperation mode, wherein the recuperation-charger operates on one side in the amplifier mode, driven by the motor-generator, as a compressor for pressure increase in the
(Continued)

outside air supply line or, on another side, driven by the charge air flow, acts as a turbine for energy recovery by the motor-generator.

10 Claims, 4 Drawing Sheets

(51) Int. Cl.
*F02B 39/10* (2006.01)
*H02K 7/18* (2006.01)
*F02M 35/10* (2006.01)
*F02B 37/013* (2006.01)

(52) U.S. Cl.
CPC ...... *F02B 37/013* (2013.01); *F02M 35/10255* (2013.01); *Y02T 10/144* (2013.01)

(56) References Cited

U.S. PATENT DOCUMENTS

| | | |
|---|---|---|
| 6,318,085 B1 | 11/2001 | Torno et al. |
| 2001/0054287 A1 | 12/2001 | Hoecker et al. |
| 2006/0064981 A1 | 3/2006 | Kojima et al. |
| 2013/0098031 A1 | 4/2013 | Petrovic et al. |
| 2016/0195047 A1* | 7/2016 | Carter .............. F02M 35/10157 60/605.1 |
| 2017/0241328 A1* | 8/2017 | Ehrhard ........... F02M 35/10255 |
| 2017/0260897 A1* | 9/2017 | Ehrhard .................. F02B 37/04 |

FOREIGN PATENT DOCUMENTS

| | | |
|---|---|---|
| DE | 10023022 A1 | 11/2001 |
| DE | 102011018570 A1 | 10/2012 |
| DE | 102011084782 A1 | 4/2013 |
| EP | 1355052 A1 | 10/2003 |
| EP | 1391595 A1 | 2/2004 |
| EP | 1749990 A2 | 2/2007 |
| JP | H02112620 A | 4/1990 |
| JP | 2007077854 A | 3/2007 |

OTHER PUBLICATIONS

German Office Action dated Sep. 1, 2015 for counterpart German Patent Application No. 10 2014 220 931.5.

Chinese Office Action dated Jul. 26, 2018 for counterpart Chinese Patent Application No. 201580055900.9.

Indian Patent Office Examination Report, dated Oct. 16, 2019, for counterpart Indian patent application 201717008109.

\* cited by examiner

CHARGING DEVICE FOR AN INTERNAL COMBUSTION ENGINE AND OPERATING METHOD FOR THE CHARGING DEVICE

CROSS-REFERENCE TO RELATED APPLICATIONS

This application claims the benefit of PCT Application PCT/EP2015/069602, filed Aug. 27, 2015, which claims priority to German Application DE 10 2014 220 931.5, filed Oct. 15, 2014. The disclosures of the above applications are incorporated herein by reference.

FIELD OF INVENTION

The invention relates to a supercharging device for an internal combustion engine having an exhaust-gas turbocharger, and to an operating method for said supercharging device.

BACKGROUND

Exhaust-gas turbochargers are increasingly used for increasing power in internal combustion engines, in particular in motor vehicles. This is done ever more commonly with the aim of reducing the structural size and weight of the internal combustion engine while maintaining the same level of power or even achieving an increased level of power, and at the same time reducing consumption and thus $CO_2$ emissions, in the context of ever more stringent legal regulations in this regard. The operating principle consists in utilizing the energy contained in the exhaust-gas flow to increase the pressure in the intake tract of the internal combustion engine and thereby realize improved charging of the combustion chamber with air oxygen and in order to thus be able to convert more fuel, gasoline or diesel, per combustion process, that is to say increase the power of the internal combustion engine.

For this purpose, an exhaust-gas turbocharger has a turbine, which is arranged in the exhaust-gas tract of the internal combustion engine and which has a turbine rotor driven by the exhaust-gas flow, and a compressor, which is arranged in the intake tract and which has a compressor rotor which builds up the pressure. The turbine rotor and compressor rotor are fastened rotationally conjointly to the opposite ends of a rotor shaft which is rotatably mounted in a bearing unit arranged between the turbine and the compressor. Thus, by means of the exhaust gas mass flow, the turbine wheel, and via the rotor shaft in turn the compressor wheel, are driven, and the exhaust gas energy is thus utilized for building up pressure in the intake tract.

Turbines and compressors are turbomachines and, owing to the laws of physics, have an optimum operating range in a manner respectively dependent on structural size and design, which optimum operating range is characterized by the mass throughput, the pressure ratio and the rotational speed of the respective rotor.

By contrast to this, the operation of an internal combustion engine in a motor vehicle is characterized by dynamic changes of the load and of the operating range.

To now be able to adapt the operating range of the exhaust-gas turbocharger to changing operating ranges of the internal combustion engine and thus ensure a desired response behavior as far as possible without noticeable decelerations (turbo lag), exhaust-gas turbochargers are equipped with additional functions, such as, for example, so-called variable turbine geometries (VTG) or wastegate devices (WG) on the exhaust-gas side and overrun air recirculation or blow-off devices on the air feed side. These serve for minimizing the inert behavior and thus the decelerated response behavior of the turbocharger and avoiding damaging operating states such as, for example, so-called compressor surging.

It is also known to use combinations of multiple turbochargers in a parallel or sequential arrangement or to use additional compressors which are operated mechanically or by electric motor, so-called supercharging blowers or superchargers, in order to cover the various operating conditions of the internal combustion engine, in order to efficiently increase the power in all rotational speed ranges and in particular during acceleration processes, and in particular to avoid the undesired turbo lag.

A supercharging device of said type, which has a conventional exhaust-gas turbocharger and an auxiliary compressor arranged in the fresh-air flow in series or in parallel with respect to the turbocharger compressor, which auxiliary compressor has a drive independent of the exhaust gas flow, for example an electric motor drive, is disclosed for example in DE 100 23 022 A1.

By contrast, in operating phases in which the power of the internal combustion engine is decreased quickly, it is the case, likewise owing to the inertia of the turbocharger, that an excess of compressor power exists, which can lead to compressor surging. In such operating states, exhaust gas is conducted, so as to bypass the turbine of the turbocharger, into the exhaust-gas tract, for example by means of a wastegate device, and already-compressed fresh air is blown off downstream of the compressor or is expanded via an overrun air recirculation device and recirculated into the intake region. The arrangement and functioning of an overrun air recirculation valve of said type are known, for example, from documents DE 28 23 067 C2 and DE 19712850A1.

In this way, the available energy is discharged, unutilized, into the surroundings, which has an adverse effect on the overall energy balance and thus on the efficiency of the internal combustion engine.

SUMMARY

The present invention is therefore based on specifying a supercharging device and an operating method therefor for an internal combustion engine, which are suitable both for assisting the build-up of charge pressure by means of the exhaust-gas turbocharger in acceleration or peak-load phases of the internal combustion engine and for utilizing, or making utilizable in the overall system of the motor vehicle, the excess energy in the supercharging system during braking or low-load phases of the internal combustion engine, and thereby increasing the efficiency of the internal combustion engine.

The supercharging device, according to embodiments of the invention, for an internal combustion engine which has an intake tract and an exhaust-gas tract, has an exhaust-gas turbocharger having an exhaust-gas turbine, which is arranged in the exhaust-gas tract of the internal combustion engine, and a fresh-air compressor having a low-pressure side and a high-pressure side, which is arranged in the intake tract of the internal combustion engine.

The fresh-air compressor is connected, on its low-pressure side, to a fresh-air supply line, and is connected, on its high-pressure side, via a charge-air feed line to a charge-air manifold of the internal combustion engine. The supercharging device is distinguished by the additional arrangement of a recuperation charger which has a compressor-turbine with a high-pressure side and a low-pressure side and which has an electromechanical motor-generator coupled to said compressor-turbine. Here, the high-pressure side of the compressor-turbine is connectable by means of a valve arrangement at one side to the fresh-air supply line and at the other side to the charge-air feed line of the internal combustion engine, such that a fresh-air mass flow can be drawn in, or a charge-air mass flow can be discharged, via the low-pressure side of the compressor-turbine. Here, a charge-air mass flow refers to a fresh-air mass flow pumped to an elevated pressure downstream, as viewed in a flow direction, of the fresh-air compressor of the exhaust-gas turbocharger, that is to say on the high-pressure side thereof.

By means of the valve arrangement and the motor-generator, the recuperation charger is operable firstly in a manner driven by the motor-generator as a compressor for increasing the pressure in the fresh-air supply line, and is operable secondly in a manner driven by the charge-air flow as a turbine for energy recovery by means of the motor-generator, or is operable neutrally.

Here, the expression "recuperation charger" is to be understood to mean a device which combines an impeller-type turbine with connected generator and an impeller-type compressor with connected electric motor in one device. Thus, an impeller-type turbine and an impeller-type compressor are combined in one unit to form what is referred to above and also below as a compressor-turbine.

Likewise, the electric motor and the generator are combined in one unit to form what is referred to above and also below as a motor-generator. The compressor-turbine and the motor-generator are coupled to one another directly or via an interposed gearing.

In the compressor-turbine, use is made of the characteristic of impellers whereby, firstly, when impinged on by a flow of a fluid at elevated pressure from the high-pressure side, they can act as a turbine and generate an output torque and, secondly, when driven by a drive torque, they can themselves generate a fluid flow with increase of the pressure and thus act as a compressor. The design of the corresponding impeller and the flow guidance in the rotor housing must, therefore, for the use as a compressor-turbine, allow for both intended uses. This may, in an advantageous refinement of the compressor-turbine, be optimized by means of a fixed or variable arrangement of flow-guiding guide vanes.

In the motor-generator, use is made of the characteristic of electric three-phase machines whereby, firstly, when a voltage and current is applied thereto, they can be operated as an electric motor with driving action and, secondly, when driven by an external torque, they can themselves generate voltage and output current. The design of the corresponding three-phase machine for use as a motor-generator must therefore allow for both intended uses.

The advantageous combination of the compressor-turbine and the motor-generator to form what is referred to above and also below as a recuperation charger advantageously permits operation of the compressor-turbine in both flow directions, specifically as a compressor in a booster operating mode when driven by electric motor action, or as a turbine so as to drive the generator in a recuperation operating mode. A further possibility consists in switching the motor-generator into a neutral state, which corresponds to a freewheeling state of the compressor-turbine and can be utilized in a standard operating mode.

The operating method, according to embodiments of the invention, for a supercharging device of an internal combustion engine according to the above description is characterized in that the supercharging device can, during operation, be switched between a standard operating mode, a booster operating mode and a recuperation operating mode in a manner dependent on the operating behavior of the internal combustion engine and by means of the valve arrangement and the motor-generator of the recuperation charger.

If a switch is made to the booster operating mode of the supercharging device in the event of a demand for increased rotational speed or in the presence of elevated load of the internal combustion engine, the high-pressure side of the compressor turbine is connected by means of the valve arrangement to the fresh-air supply line, and at the same time, the motor-generator is operated as a drive motor and fresh air is drawn in via the low-pressure side of the compressor-turbine, compressed and fed at elevated pressure into the fresh-air supply line upstream of the exhaust-gas turbocharger, which results in an accelerated pressure increase in the charge-air line and in the charge-air manifold, thus in a torque increase even at low engine speed, and thus in improved acceleration behavior of the internal combustion engine.

If, on the other hand, a rapid decrease in power of the internal combustion engine is necessary or the charge-air mass flow, which is or can be generated by the fresh-air compressor of the exhaust-gas turbocharger, is not fully required in low-load operation, a switch can be made into the recuperation operating mode of the supercharging device. Here, the high-pressure side of the compressor-turbine is connected by means of the valve arrangement to the charge-air feed line, and at the same time, the motor-generator is operated as a generator. Now, the charge-air mass flow not required by the internal combustion engine is conducted at high pressure to the compressor-turbine and thus drives the motor-generator, which in turn converts the imparted torque into electrical energy which can be supplied directly to another consumer in the vehicle or to an accumulator. Thus, the excess energy in the supercharging device is not released unutilized to the surroundings, but rather can be supplied for more expedient use, possibly at a later point in time.

If the internal combustion engine is operated for example at medium, constant load, the supercharging device can be switched into the standard operating mode. Here, the high-pressure side of the compressor-turbine is connected by means of the valve arrangement to the fresh-air supply line, and at the same time the motor-generator is switched into a neutral state, and thus fresh air can also be drawn in by means of the compressor-turbine without this being additionally compressed. The charge pressure generated by the exhaust-gas turbocharger is adequate, and excess energy is not available in the system.

The advantages of the supercharging device, according to embodiments of the invention, and of the corresponding operating method lie in particular in the fact that, depending on the operating situation of the internal combustion engine, a fast increase of torque and thus rotational speed are made possible while avoiding turbo lag, and in the opposite case of a fast decrease in power, excess energy does not have to be dissipated unutilized, but rather can be made utilizable.

BRIEF DESCRIPTION OF THE DRAWINGS

Below, particularly advantageous exemplary embodiments and refinements of the invention will be discussed in more detail on the basis of the figures, even though the subject matter of the invention is not restricted to these examples and in particular to the combinations of features presented therein.

In the figures.

DETAILED DESCRIPTION

Items of identical function and designation are denoted by the same reference designations throughout the figures.

Figure 2:
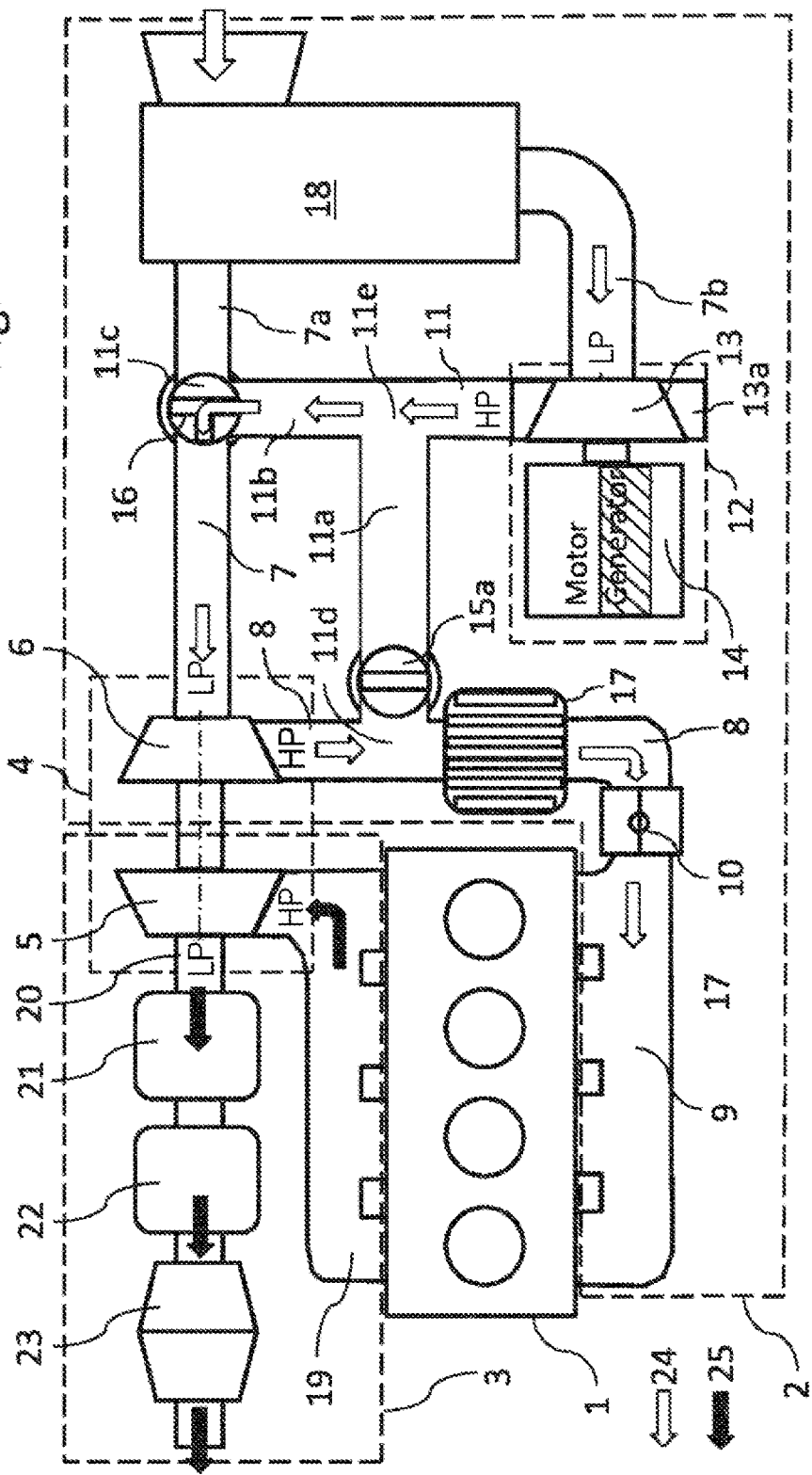
FIG. 2 is a simplified schematic illustration of the supercharging device according to a second exemplary embodiment of the invention in conjunction with an internal combustion engine in the booster mode.

The exemplary embodiment of the invention in FIG. 2 shows, in a schematic illustration, an internal combustion engine 1, illustrated in this case as a four-cylinder in-line engine, having an intake tract 2 and an exhaust-gas tract 3. Also illustrated is an exhaust-gas turbocharger 4 with an exhaust-gas turbine 5 and a fresh-air compressor 6, and a so-called recuperation charger 12, which has a turbine compressor 13 and an electromechanical motor-generator 14.

The exhaust-gas tract 3 includes an exhaust-gas manifold 19, which is connected to the internal combustion engine 1; the exhaust-gas turbine 5, which is connected on its high-pressure side HP to the exhaust-gas manifold 19; an exhaust-gas discharge line 20, which is connected to the low-pressure side LP of the exhaust-gas turbine 5; and an exhaust-gas catalytic converter 21, a soot particle filter 22 and a silencer 23, which are arranged along the exhaust-gas discharge line 20. The exhaust-gas mass flow 25 discharged from the internal combustion engine 1 is discharged from the exhaust manifold 19 by the exhaust-gas turbine 5 into the exhaust-gas discharge line 20 and through exhaust-gas catalytic converter 21, soot particle filter 22 and silencer 23 into the surroundings.

The intake tract 2 includes a charge-air manifold 9, which is connected to the internal combustion engine 1, the fresh-air compressor 6 of the exhaust-gas turbocharger 4, and a charge-air feed line 8, which is connected at one side via a throttle flap valve 10 to the charge-air manifold 9 and which is connected at the other side to the high-pressure side HP of the fresh-air compressor 6. Furthermore, the intake tract 2 comprises a fresh-air supply line 7, which is connected at one side to the low-pressure side LP of the fresh-air compressor 6 and at the other side via an intake connector 7a to a fresh-air filter box 18. Likewise assigned to the intake tract 2 is a recuperation charger 12 which has a compressor-turbine 13 and, coupled thereto, a motor-generator 14. The low-pressure side LP of the compressor-turbine 13 is connected via an intake connector 7b to the fresh-air filter box 18. To the high-pressure side HP of the compressor-turbine 13 there is connected a branching line 11 which, at the branching point 11e, divides into a charge-air branch 11a and a fresh-air branch 11b. The fresh-air branch 11b is connected at a fresh-air branch connection point 11c to the fresh-air supply line 7, and the charge-air branch 11a is connected at a charge-air branch connection point 11d to the charge-air feed line 8 and thus connects the high-pressure side HP of the compressor-turbine 13 both to the low-pressure side LP of the fresh-air compressor 6 of the exhaust-gas turbocharger 4 via the branching line 11, the fresh-air branch 11b and the fresh-air supply line 7, and to the high-pressure side HP of the fresh-air compressor 6 of the exhaust-gas turbocharger 4 via the branching line 11, the charge-air branch 11a and the charge-air feed line 8. Furthermore, a charge-air cooler 17 is arranged in the charge-air feed line 8, between the high-pressure side HP of the fresh-air compressor 6 and the charge-air branch connection point 11d.

In the fresh-air branch 11b and in the charge-air branch 11a and also in the fresh-air supply line 7 between the fresh-air branch connection point 11c and the intake connector 7a of the fresh-air feed line 7, that is to say upstream of the fresh-air branch connection point 11c in a fresh-air mass flow (FIG. 2), there is arranged in each case one shut-off valve (15a, 15b, 15c). Through corresponding valve setting of the shut-off valves (15a, 15b, 15c), the flow direction of the fresh-air mass flow 24, indicated here by the light arrows, in the branching line 11 and via the compressor-turbine 13 can be switched.

Figure 1:
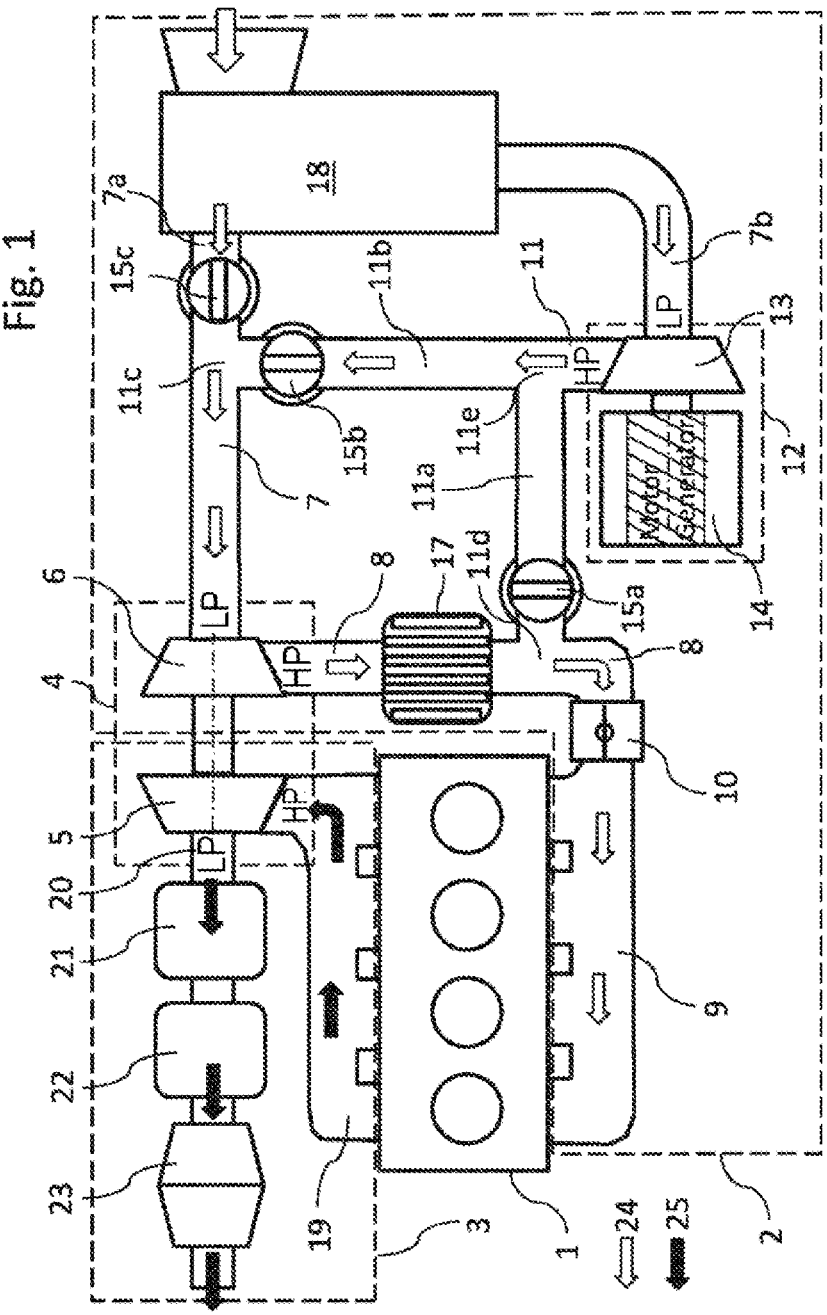
FIG. 1 is a simplified schematic illustration of the supercharging device according to an exemplary embodiment of the invention in conjunction with an internal combustion engine in the standard mode.

The valve setting of the shut-off valves (15a, 15b, 15c) shown in FIG. 1 characterizes the standard operating mode of the supercharging device, which is set when the internal combustion engine 1 is running at more or less constant load in a more or less constant low to medium rotational speed band. Here, the shut-off valve 15c and thus the fresh-air supply line 7 upstream of the fresh-air branch connection point 11c in the fresh-air mass flow 24 direction, and the shut-off valve 15b and thus the fresh-air branch 11b, are open, and the shut-off valve 15a and thus the charge-air branch 11a are closed. At the same time, the motor-generator 14 of the recuperation charger 12 is switched into a neutral state, which is symbolized by the fact that both the "motor" and the "generator" designations have been struck through.

In the standard operating mode, therefore, a fresh-air mass flow 24 is drawn in by the low-pressure side LP of the fresh-air compressor 6 of the exhaust-gas turbocharger 4 from the fresh-air filter box 18 via the intake connector 7a of the fresh-air supply line 7 and likewise via the fresh-air branch 11, the freewheeling compressor-turbine 13 and the intake connector 7b of the compressor-turbine 13. In the fresh-air compressor 6 of the exhaust-gas turbocharger 4, the fresh-air mass flow 24 is compressed and is, on the high-pressure side HP of the fresh-air compressor 6, pumped at elevated pressure into the charge-air feed line 8 and via the at least partially opened throttle flap valve 10 and the charge-air manifold 9 into the cylinders of the internal combustion engine 1. The fresh-air mass flow 24 discharged on the high-pressure side HP of the fresh-air compressor 6 is also referred to in this context as charge-air mass flow (24), which is intended to indicate the elevated pressure level. By means of the charge-air cooler 17 arranged in the charge-air feed line 8, the charge-air mass flow 24 is cooled, whereby the oxygen quantity supplied to the cylinders of the internal combustion engine 1 and thus the power of the internal combustion engine 1 can be further increased. The charge-air cooler 17 is in this case arranged between the high-pressure side HP of the fresh-air compressor 6 and the charge-air branch connection point 11d, which in the case of a switch to the recuperation operating mode, which will be discussed in more detail further below in the text on the basis of FIG. 3, has the effect that the excess charge-air mass flow 24 is conducted, having been cooled, to the compressor-turbine 13 of the recuperation charger 12. This has the advantage that the components of the compressor-turbine 13 do not need to be designed for elevated temperatures, and therefore a less expensive construction is made possible.

FIG. 2 shows substantially the same configuration of internal combustion engine 1, exhaust-gas tract 3 and intake tract 2 as in FIG. 1. In the intake tract 2, the design variant, however, differs in that the shut-off valve 15b in the fresh-air branch 11b and the shut-off valve 15c in the fresh-air supply line 7 are together replaced by a switching valve 16 at the fresh-air branch connection point 11c. This reduces the number of individual components required, simplifies the actuation of the valves, and reduces the overall structural size of the supercharging device.

Figure 3:
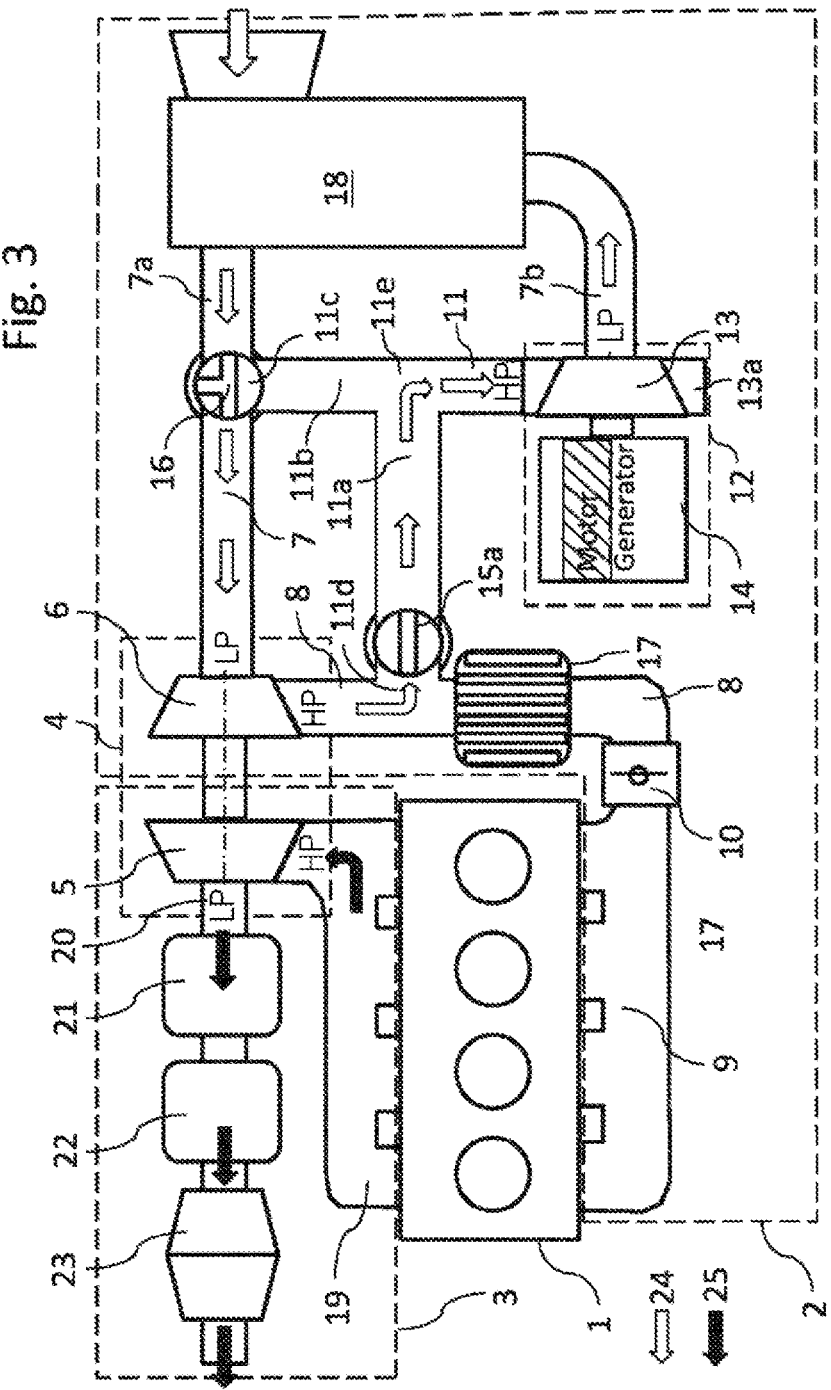
FIG. 3 shows the supercharging device according to the second exemplary embodiment of the invention as per FIG. 2, in the recuperation mode.

As can also be seen from the schematic illustration, the switching valve 16 is designed such that, in one of three switching positions, it opens up the passage from the fresh-air branch 11b to the fresh-air supply line 7 while shutting off the passage from the fresh-air supply line 7 to the intake connector 7a, that is to say the fresh-air supply line 7 upstream of the fresh-air branch connection point 11c, as illustrated in FIG. 2. In a further one of the three possible switching positions, the switching valve shuts off the passage from the fresh-air branch 11b to the fresh-air supply line 7 while opening up the passage from the fresh-air supply line 7 to the intake connector 7a, that is to say the fresh-air supply line 7 upstream of the fresh-air branch connection point 11c, as illustrated in FIG. 3. In the third switching position of the switching valve 16, both the passage from the fresh-air branch 11b to the fresh-air supply line 7 and the passage from the fresh-air supply line 7 to the intake connector 7a, that is to say the fresh-air supply line 7 upstream of the fresh-air branch connection point 11c, are opened up, and this corresponds to the valve position of the two shut-off valves 15b and 15c as illustrated in FIG. 1.

Furthermore, the charge-air cooler 17 is arranged in the charge-air feed line 8 downstream of the charge-air branch connection point 11d in the flow direction of the charge-air mass flow 24, that is to say between the charge-air branch connection point 11d and the throttle flap valve 10. In the event of a switch to the recuperation operating mode, which will be discussed in yet more detail further below in the text on the basis of FIG. 3, this has the effect that the excess charge-air mass flow 24 is conducted, without having been cooled, to the compressor-turbine 13 of the recuperation charger 12. This has the advantage that the energy content of the charge-air mass flow 24 for the recuperation, that is to say the energy recovery, is at a maximum, because no energy is extracted by cooling from the charge-air mass flow 24 and released into the surroundings.

Furthermore, here, the compressor-turbine 13 is equipped with a static or variable guide vane arrangement 13a in the compressor-turbine housing, though this is only illustrated merely schematically in FIG. 2. In the booster operating mode of the supercharging device as illustrated in FIG. 2, the guide vane arrangement 13a serves for the optimization of the outflow behavior of the fresh-air mass flow 24 on the high-pressure side HP of the compressor-turbine.

Furthermore, the valve setting of shut-off valve 15a and switching valve 16 as shown in FIG. 2 characterizes the booster operating mode of the supercharging device, which is set when the load of the internal combustion engine 1 is dynamically increased or a dynamic increase in rotational speed is demanded or the internal combustion engine is operated close to or at maximum load.

Here, the switching valve 16 opens up the passage from the fresh-air branch 11b to the fresh-air supply line 7, whereas the passage from the fresh-air supply line 7 to the intake connector 7a, that is to say the fresh-air supply line 7 upstream of the fresh-air branch connection point 11c, is shut off.

The shut-off valve 15a and thus the charge-air branch 11a remain closed. At the same time, the motor-generator 14 of the recuperation charger 12 is switched to motor operation, which is symbolized by the fact that only the "generator" designation, but not the "motor" designation, is struck through. In motor operation of the motor-generator 14, the compressor-turbine 13 is driven by the motor-generator 14, and thus acts as a compressor.

In the booster operating mode, therefore, a fresh-air mass flow 24 is drawn in by the low-pressure side LP of the compressor-turbine 13 only via the intake connector 7b of the compressor-turbine 13 of the recuperation charger 12 from the fresh-air filter box 18. In the compressor-turbine 13 of the recuperation charger 12, the fresh-air mass flow 24 is pre-compressed and, on the high-pressure side HP of the compressor-turbine 13, is fed at elevated pressure via the branching line 11, the fresh-air branch 11b and the switching valve 16 into the fresh-air supply line 7. Said pressure increase propagates without delay via the fresh-air compressor 6, the charge-air cooler 17 and the in this case fully open throttle flap valve 10, whereby the charge-air mass flow 24 is very quickly available at elevated pressure in the charge-air manifold 9 and thus ensures improved response behavior of the internal combustion engine.

When, during the further process, the exhaust-gas turbocharger has overcome its moment of inertia, the pre-compressed fresh-air mass flow 24 is compressed further by means of the fresh-air compressor 6, that is to say the pressure of the charge-air mass flow 24 is increased further, which leads to a further increase in power of the internal combustion engine 1.

FIG. 3 shows the same construction of the supercharging device as FIG. 2, but the valve setting of shut-off valve 15a and switching valve 16 shown in FIG. 3 characterizes the recuperation operating mode of the supercharging device, which is set if the load of the internal combustion engine 1 is dynamically reduced and a dynamic rotational speed drop is predefined or if an excess charge-air mass flow 24 is available for other reasons. During driving operation of a motor vehicle, this corresponds for example to a more or less intense braking operation with decoupled transmission or to overrun operation with the internal combustion engine 1 imparting a braking action. Here, the throttle flap valve 10 is rapidly closed or is held closed, whereas the fresh-air compressor 6 of the exhaust-gas turbocharger 4, owing to its inertia, initially continues to deliver and compress the fresh-air mass flow 24. In this case, in the recuperation operating mode, the switching valve 16 shuts off the passage from the fresh-air branch 11b to the fresh-air supply line 7, whereas the passage from the fresh-air supply line 7 to the intake connector 7a, that is to say the fresh-air supply line 7 upstream of the fresh-air branch connection point 11c, is open. The shut-off valve 15a and thus the charge-air branch 11a are now open. Here, the shut-off valve 15a in the charge-air branch 11a does not have to be fully open in all situations; it is rather also possible for the valve opening to be regulated by means of an external control unit (not illustrated) such that the present setpoint charge pressure is maintained and exactly only the excess charge-air mass flow fraction is discharged from the charge-air feed line 8 and conducted to the compressor-turbine 13 for energy recovery purposes.

At the same time, the motor-generator 14 of the recuperation charger 14 is switched to generator mode, which is symbolized by the fact that only the "motor" designation but not the "generator" designation is struck through.

The excess charge-air mass flow 24 delivered by the fresh-air compressor 6 is thus conducted partially or entirely via the open shut-off valve 15a, the charge-air branch 11a and the branching line 11 to the high-pressure side HP of the compressor-turbine 13. The compressor-turbine 13 is impinged on by the charge-air mass flow 24 from the high-pressure side HP. To optimize the impingement of flow, it is possible for a variable guide vane arrangement 13a, if provided, to be switched to the turbine mode.

Driven by the charge-air mass flow 24, the compressor-turbine 13 thus acts as a turbine, which in turn drives the motor-generator 14 switched into the generator mode. By means of this drive, the motor-generator 14 generates electrical energy, which can advantageously be introduced into a corresponding accumulator, for example a battery or a capacitor (not illustrated). It is thus advantageously possible for excess energy to be kept in the system and made utilizable.

Figure 4:
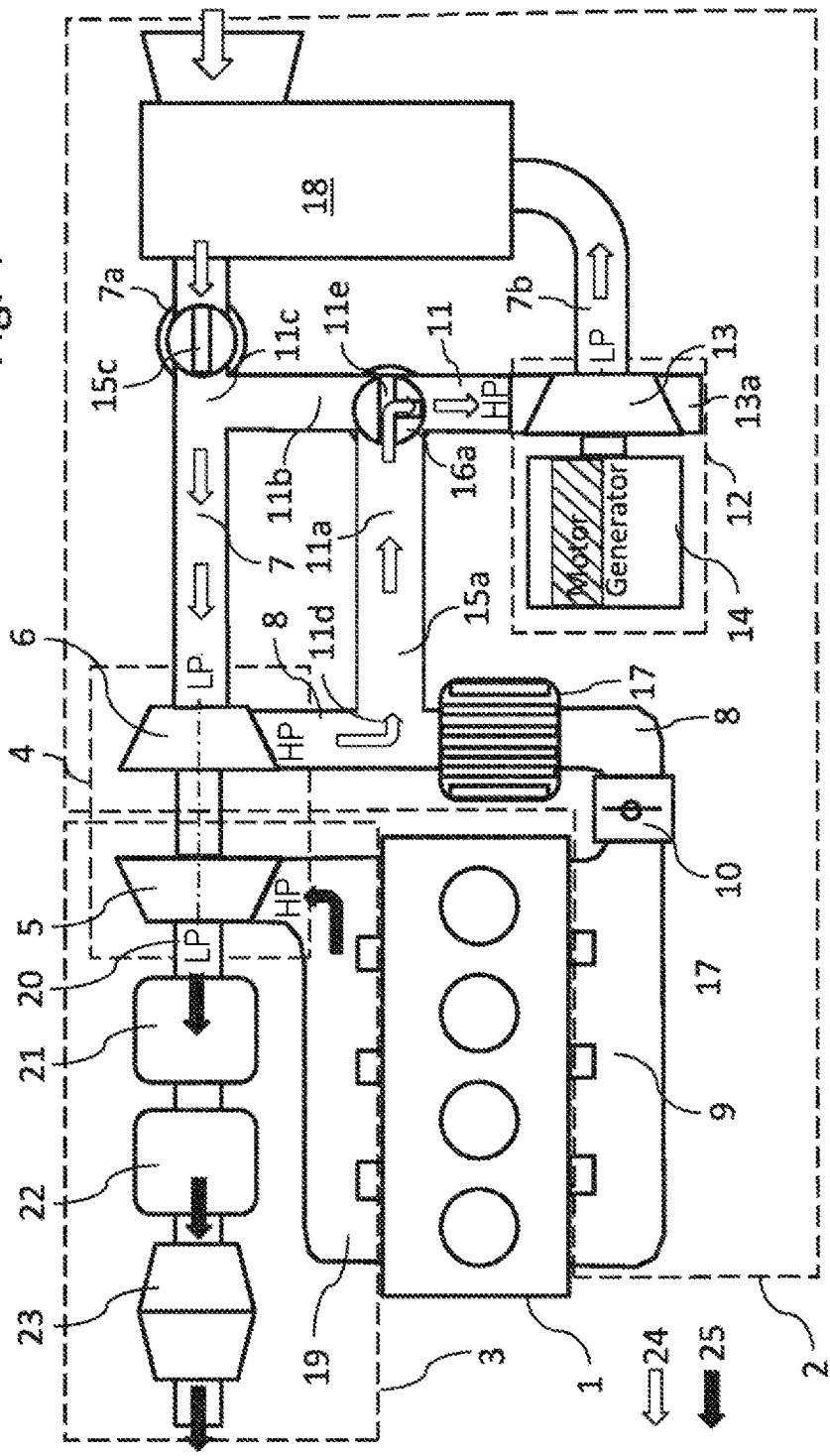
FIG. 4 shows the supercharging device according to a further exemplary embodiment of the invention, in the recuperation mode.

FIG. 4 shows the supercharging device according to a further exemplary embodiment of the invention. Said exemplary embodiment is characterized, in relation to the exemplary embodiment of FIGS. 2 and 4, by a changed valve arrangement, wherein a shut-off valve in the charge-air branch and a shut-off valve in the fresh-air branch lib are collectively replaced by a switching valve 16a at the branching point 11e of the branching line 11, and a further shut-off valve 15c is arranged in the fresh-air supply line 7 upstream of the fresh-air branch connection point 11c in a fresh-air mass flow 24, that is to say between the fresh-air branch connection point 11c and the intake connector 7a of the fresh-air supply line.

The switching valve 16a is in this case designed such that, in one of two switching positions, it opens up the passage from the branching line 11 to the fresh-air branch 11b and thus to the fresh-air supply line 7 while blocking the passage to the charge-air branch 11a, which corresponds to the valve setting in the standard operating mode and in the booster operating mode (not illustrated). In the second switching position of the switching valve 16a, it is the case, as illustrated in FIG. 4, that the passage from the branching line 11 to the fresh-air branch 11b and thus to the fresh-air supply line 7 is shut off, while the passage to the charge-air branch 11a is opened up, which corresponds to the valve position in the recuperation operating mode.

In the recuperation operating mode, the shut-off valve 15c in the fresh-air supply line 7 is simultaneously opened, such that the fresh-air compressor 6 of the exhaust-gas turbocharger 4 can draw a fresh-air mass flow 24 in from the fresh-air filter box 18. The conducting of the fresh-air or charge-air mass flow 24 thus corresponds to the example shown in FIG. 3.

Summarized briefly once again, embodiments of the invention thus relate to a supercharging device and to an operating method for said supercharging device for an internal combustion engine 1, which supercharging device has an exhaust-gas turbocharger 4 and a recuperation charger 12, which has a compressor-turbine 13 and an electromechanical motor-generator coupled thereto. Here, the high-pressure side HP of the compressor turbine 13 is connectable by means of a valve arrangement at one side to the fresh-air supply line 7 upstream of the exhaust-gas turbocharger 4 and at the other side to a charge-air feed line 8 downstream of the exhaust-gas turbocharger 4, wherein, via the low-pressure side LP of the compressor-turbine 13, a fresh-air mass flow 24 can be drawn in or a charge-air mass flow 24 can be discharged.

Said recuperation charger 12 can, by means of a valve arrangement and the motor-generator 14, be switched between a standard operating mode, a booster operating mode and a recuperation operating mode, wherein said recuperation charger acts firstly in the booster operating mode in a manner driven by the motor-generator 14 as a compressor for increasing pressure in the fresh-air supply line 8, or acts secondly in a manner driven by the charge-air flow as a turbine for energy recovery by means of the motor-generator 14, or is operable neutrally.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A supercharging device for an internal combustion engine having an intake tract and having an exhaust-gas tract, the supercharging device comprising:
    an exhaust-gas turbocharger having an exhaust-gas turbine, which is arranged in the exhaust-gas tract, and a fresh-air compressor having a low-pressure side and a high-pressure side, which is arranged in the intake tract;
    a fresh-air supply line to which the fresh-air compressor is connected on the low-pressure side thereof;
    a charge-air feed line which connects the high-pressure side of the fresh-air compressor to a charge-air manifold of the internal combustion engine; and
    a recuperation charger which has a compressor-turbine with a high-pressure side and a low-pressure side and which has an electromechanical motor-generator coupled to said compressor-turbine,
    wherein the high-pressure side of the compressor-turbine is connectable by a valve arrangement at one side to the fresh-air supply line and at the other side to the charge-air feed line and a fresh-air mass flow is drawn in, or a charge-air mass flow is discharged, via the low-pressure side of the compressor-turbine, and
    wherein the recuperation charger is operable firstly in a manner driven by the motor-generator as a compressor for increasing pressure of the fresh-air mass flow in the fresh-air supply line, and is operable secondly in a manner driven by the charge-air mass flow as a turbine for energy recovery by the motor-generator.

2. The supercharging device as claimed in claim 1, wherein the compressor-turbine is, via a branching line which has a branching point, connected by a fresh-air branch to the fresh-air supply line at a fresh-air branch connection point and connected by a charge-air branch to the charge-air feed line at a charge-air branch connection point, and in each case one shut-off valve is arranged in the fresh-air branch and in the charge-air branch and also in the fresh-air supply line, upstream of the fresh-air branch connection point in a fresh-air mass flow, and flow direction of a fresh-air mass flow in the branching line and via the compressor-turbine is switched through corresponding valve settings of the shut-off valves.

3. The supercharging device as claimed in claim 1, wherein the compressor-turbine is, via a branching line which has a branching point, connected by a fresh-air branch to the fresh-air supply line at a fresh-air branch connection point and connected by a charge-air branch to the charge-air feed line at a charge-air branch connection point, and the supercharging device further includes a switching valve disposed at the fresh-air branch connection point.

4. The supercharging device as claimed in claim 1, wherein the compressor-turbine is, via a branching line which has a branching point, connected by a fresh-air branch to the fresh-air supply line at a fresh-air branch connection point and connected by a charge-air branch to the charge-air feed line at a charge-air branch connection point, and the supercharging device further includes a switching valve disposed at the branching point of the branching line.

5. The supercharging device as claimed in claim 2, wherein a charge-air cooler is provided in the charge-air feed line, wherein the charge-air branch connection point of the charge-air branch is arranged downstream, in a fresh-air mass flow, of the charge-air cooler in the charge-air feed line.

6. The supercharging device as claimed in claim 2, wherein a charge-air cooler is provided in the charge-air feed line, wherein the charge-air branch connection point of the charge-air branch is arranged upstream, in a fresh-air mass flow, of the charge-air cooler in the charge-air feed line.

7. The supercharging device as claimed in claim 1, wherein the compressor-turbine of the recuperation charger is equipped with a fixed or variable guide vane arrangement in a compressor-turbine housing of the compressor-turbine for the purposes of improving the outflow behavior or inflow behavior of the fresh-air mass flow or of the charge-air mass flow.

8. The supercharging device as claimed in claim 1, wherein the fresh-air supply line is connected via a first intake connector, and the low-pressure side of the compressor-turbine is connected via a further intake connector, to a fresh-air filter box.

9. The supercharging device as claimed in claim 1, wherein the supercharging device is configured, during operation, to be switched between a standard operating mode, a booster operating mode, and a recuperation operating mode in a manner dependent on an operating behavior of the internal combustion engine and by the valve arrangement and the motor-generator of the recuperation charger.

10. The supercharging device as claimed in claim 2,
wherein the supercharging device is configured, during operation, to be switched between a standard operating mode, a booster operating mode, and a recuperation operating mode in a manner dependent on an operating behavior of the internal combustion engine and by the valve arrangement and the motor-generator of the recuperation charger,
wherein the valve arrangement has at least one of shut-off valves and a switching valve,
wherein, to implement the standard operating mode, the fresh-air supply line, upstream of the fresh-air branch connection point in the fresh-air mass flow direction, and the fresh-air branch are opened, the charge-air branch is closed, and the motor-generator is switched into a neutral state, and
wherein, to implement the booster operating mode, the fresh-air supply line, upstream of the fresh-air branch connection point in the fresh-air mass flow direction, and the charge-air branch are closed, the fresh-air branch is opened, and the motor-generator is switched into the motor mode so as to drive the compressor-turbine for the purposes of increasing pressure in the fresh-air supply line, and
wherein, to implement the recuperation operating mode, the fresh-air supply line, upstream of the fresh-air branch connection point in the fresh-air mass flow direction, and the charge-air branch are opened, the fresh-air branch is closed, and the motor-generator is switched into the generator mode so as to be driven by the compressor-turbine for the purposes of energy recovery.

* * * * *